H. HESS.
BALL BEARING.
APPLICATION FILED AUG. 13, 1908.

959,529. Patented May 31, 1910.

Witnesses:
Frank S. Ober
Waldo M. Chapin

Inventor:
HENRY HESS,
By his Attorney
Robert Fletcher Rogers ical application, however, may be conveniently designated by the word "piece," and that the sliding surfaces of

UNITED STATES PATENT OFFICE.

HENRY HESS, OF WAWA, PENNSYLVANIA.

BALL-BEARING.

959,529. Specification of Letters Patent. Patented May 31, 1910.

Application filed August 13, 1908. Serial No. 448,309.

*To all whom it may concern:*

Be it known that I, HENRY HESS, a citizen of the United States, residing at Wawa, in the county of Delaware and State of Pennsylvania, have invented certain new and useful Improvements in Ball-Bearings, of which the following is a specification, reference being had therein to the accompanying drawing.

My invention relates to ball bearings, and more particularly to that class thereof intended for employment in sustaining either radial or thrust loads or any combination thereof, and wherein the casing rings are formed with tracks or ways for the balls which extend about and beyond the transverse diameters thereof. More specifically, these tracks or ways are approximately semi-circular in cross-section, that in the inner ring contacting with and supporting the inner working side of the balls and projecting outwardly to support and contact with one of the lateral working sides, and that in the outer ring contacting with and supporting the outer working side of the balls and projecting inwardly to contact with and support the other of the lateral working sides.

Because of the construction above described, it will be obvious that special means are requisite to permit the assemblage of the parts, and to this end I cut away or form one of the rings with an annular space or recess throughout its circumference, whereby the ring may be freely passed over the other parts, after which the recess is filled with a detachably secured annular section. In this manner and as will appear from the specific description which follows, I provide a bearing which is capable of sustaining both radial and thrust loads, and which is therefore practically universal in its application.

Figure 1:
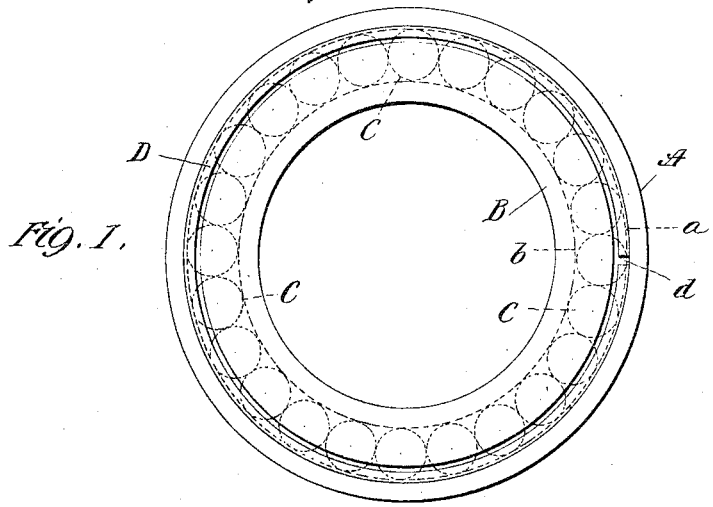
Figure 2:
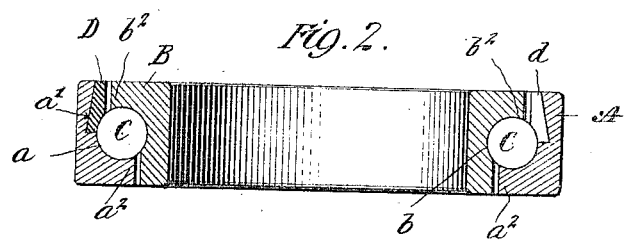
Figure 3:
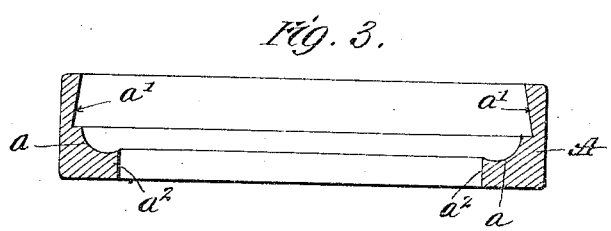

Referring to the drawing: Figure 1 is a side view of a bearing having my invention applied thereto, certain of the parts being shown in dotted lines; Fig. 2 is a transverse sectional view thereof; and Fig. 3 is a similar view showing one of the casing rings detached.

The outer ring A and the inner ring B, provided respectively with the ball tracks or ways $a$ and $b$, together with the balls C, C, are constructed and arranged in the well-known manner, except in so far as subsequently described. The chief difference to be noted is that the tracks or ways are each formed so as to contact with and support the balls through substantially 180° of their working surfaces,—in other words, these tracks or ways are substantially or approximately semi-circular in cross-section.

Referring to the drawing, it will be noted that the inner ring B is provided with an outwardly extending annular flange $b^2$, which extends almost to the inner surface of the ring A. This projection enables me to extend the contacting and supporting surface of the track or way $b$ beyond the transverse diameters of the balls, and it therefore affords support for both the inner working side and one of the lateral working sides at any given moment. Similarly the outer ring A is provided with an inwardly projecting annular flange $a^2$ on the opposite side of the balls, thus enabling the track or way $a$ to support the outer working side and the other of the lateral working sides in the same manner and at the same time. It will thus be seen that a proper resistance will be afforded to the load, whether it be thrust or lateral or any resultant of thrust or lateral pressure. This result follows from the fact that the complementary and combined tracks or ways practically correspond in cross-section with the outline of the balls, and consequently there will be adequate resistance to the pressure no matter in what direction it be exerted. It will be seen that special provisions are necessary for the assemblage of the elements due to the close approximation of the outer and inner rings. This I accomplish by cutting away one of the rings, and forming an annular recess therein, as shown for instance at $a^1$ in the ring A, to permit its being placed over the balls which have been previously assembled in the other ring. To secure the rings in assembled position, I employ the detachable tapered annular piece D, which is shown as split at $d$, so as to permit of its insertion into the correspondingly shaped recess $a^1$ previously mentioned. The particular form of annular piece and its location, however, constitute no part of my invention, as obviously many equivalent substitutes therefor may be employed. As previously pointed out, I thus provide a bearing which is capable of sustaining both thrust and radial loads as well as any resultant thereof, and which may be readily assembled and disassembled.

I do not desire to limit my invention to the particular form herein shown by way of example, and, generally speaking, it is to be understood that it is not limited to any particular embodiment, except in so far as such limitations are specified in the claims.

Having thus described my invention, its construction and mode of operation, what I claim and desire to secure by Letters Patent of the United States is as follows:

1. In a ball bearing, the combination of the casing rings and the balls, the rings being formed with complementary tracks or ways for the balls which extend about and beyond the transverse diameters thereof, one of the rings being formed with an annular recess to permit the assemblage of the parts and provided with a detachable annular section to fill the said recess and to hold the several parts in assembled position.

2. In a ball bearing, the combination of the casing rings and the balls, the rings being formed with tracks or ways approximately semi-circular in cross-section, so that the balls are supported on two working sides by one track or way and on the other two working sides by the other track or way, one of the rings being formed with an annular recess to permit the assemblage of the parts and provided with a detachable annular section to fill the said recess and to hold the several parts in assembled position.

3. In a ball bearing, the combination of the inner and outer rings and the balls, the inner ring being formed with a track or way for the inner working side of the balls and projecting outwardly beyond the transverse diameters thereof to contact with one of the lateral working sides, and the outer ring being formed with a complementary track or way for the outer working side of the balls and projecting inwardly to contact with the other of the lateral working sides, one of the rings being formed with an annular recess to permit the assemblage of the parts and provided with a detachable annular section to fill the said recess and to hold the several parts in assembled position.

4. In a ball bearing, the combination of the casing rings and the balls, the rings being formed with tracks or ways approximately semi-circular in cross-section, so that the balls are supported on two working sides by one track or way and on the other two working sides by the other track or way, one of the rings being cut away throughout its periphery to permit the assemblage of the parts and provided with suitable retaining means to hold it in assembled relation to the other parts.

In testimony whereof I have affixed my signature in presence of two witnesses.

HENRY HESS.

Witnesses:
  NETTIE L. HAHN,
  THEO. H. M'CALLA.